US006821310B2

(12) United States Patent
    Hedström

(10) Patent No.: US 6,821,310 B2
(45) Date of Patent: Nov. 23, 2004

(54) DEVICE AND METHOD FOR AIR FILTRATION

(75) Inventor: Anders Hedström, Stockholm (SE)

(73) Assignee: Clair Finance AB, Taby (SE)

( * ) Notice: Subject to any disclaimer, the term of this patent is extended or adjusted under 35 U.S.C. 154(b) by 0 days.

(21) Appl. No.: 10/203,657

(22) PCT Filed: Feb. 23, 2001

(86) PCT No.: PCT/SE01/00402
    § 371 (c)(1),
    (2), (4) Date: Oct. 30, 2002

(87) PCT Pub. No.: WO01/64311
    PCT Pub. Date: Sep. 7, 2001

(65) Prior Publication Data
    US 2003/0116020 A1 Jun. 26, 2003

(30) Foreign Application Priority Data
    Feb. 28, 2000 (SE) .............................................. 0000644

(51) Int. Cl.⁷ ............................................... B01D 46/12
(52) U.S. Cl. .............................. 55/356; 55/471; 55/472; 55/502; 55/385.1; 55/DIG. 18; 95/273; 454/187
(58) Field of Search ......................... 55/356, 471, 472, 55/502, 385.1, 385.2, DIG. 18; 95/273; 454/187

(56) References Cited

U.S. PATENT DOCUMENTS

| | | | | |
|---|---|---|---|---|
| 4,531,956 A | * | 7/1985 | Howorth | ................. 55/DIG. 29 |
| 4,810,269 A | * | 3/1989 | Stackhouse et al. | ........... 55/356 |
| 5,232,478 A | * | 8/1993 | Farris | ............................ 55/356 |
| 5,240,478 A | * | 8/1993 | Messina | ....................... 55/356 |
| 5,509,946 A | | 4/1996 | Chu | |

FOREIGN PATENT DOCUMENTS

FR  2749771  12/1997

* cited by examiner

Primary Examiner—Blaine Copenheaver
Assistant Examiner—Minh-Chau T. Pham
(74) Attorney, Agent, or Firm—Jacobson Holman PLLC

(57) ABSTRACT

A method and a device for air filtration, whereby air is drawn from the surroundings of a house through air filters including at least a portion of the wall of the house and is blown out to the surroundings in cleaned condition. Air is drawn through at least two different parallel coupled filter units, which clean the air in a corresponding number of ways. Predetermined fractions of total drawn-in air passes through the respective different filter units and thus are subjected to corresponding cleaning by the different filter units being adjusted to each other with respect to pressure drop. The differently cleaned fractions are mixed before exhaust.

21 Claims, 3 Drawing Sheets

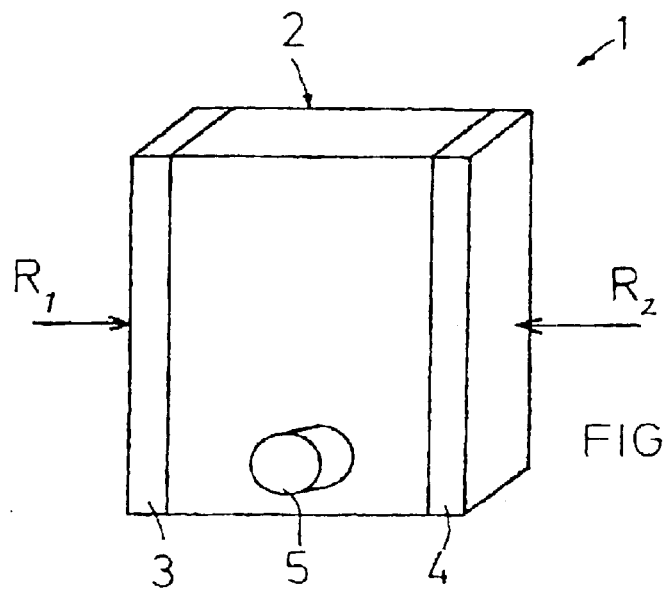
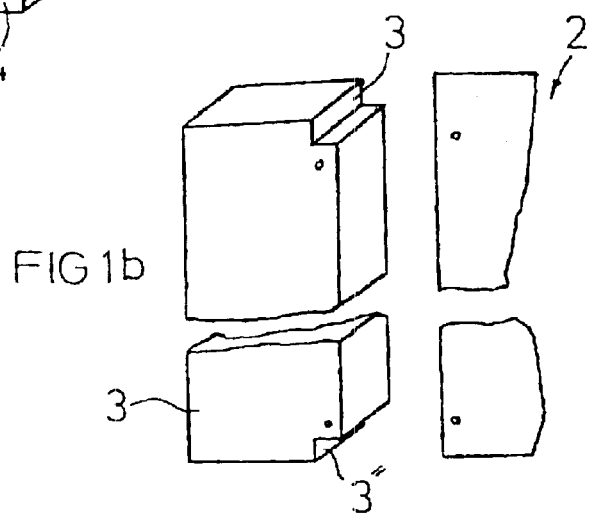
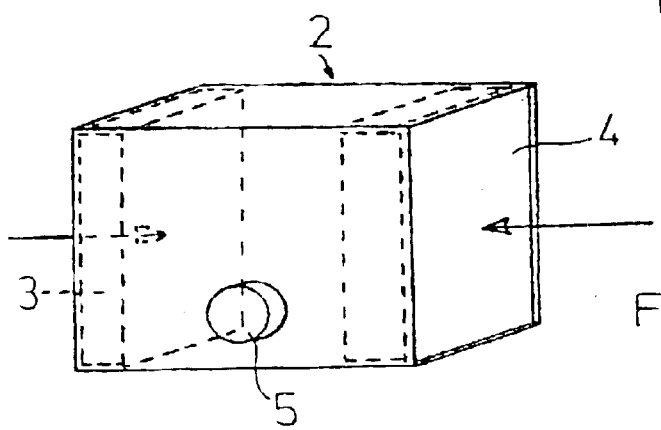

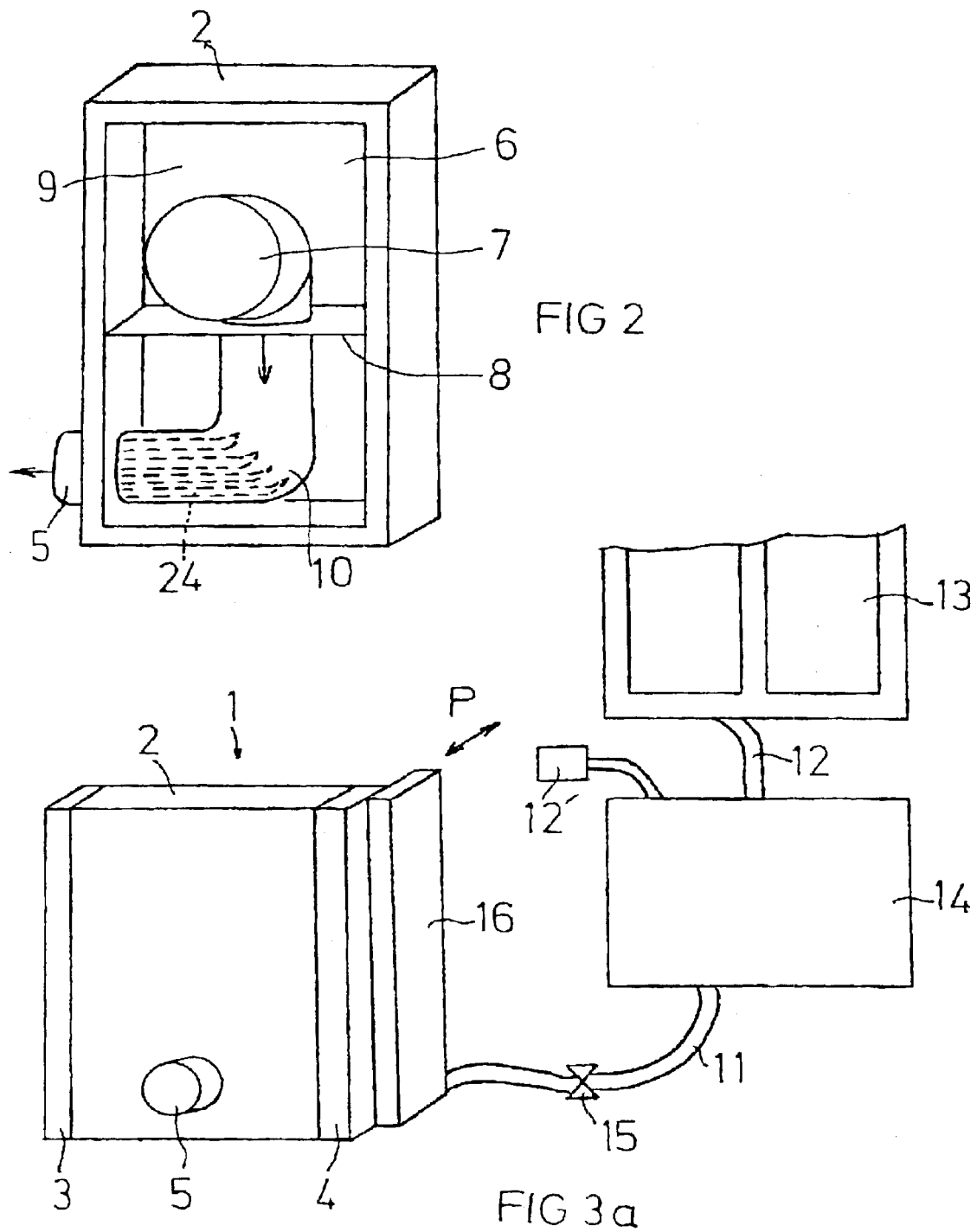

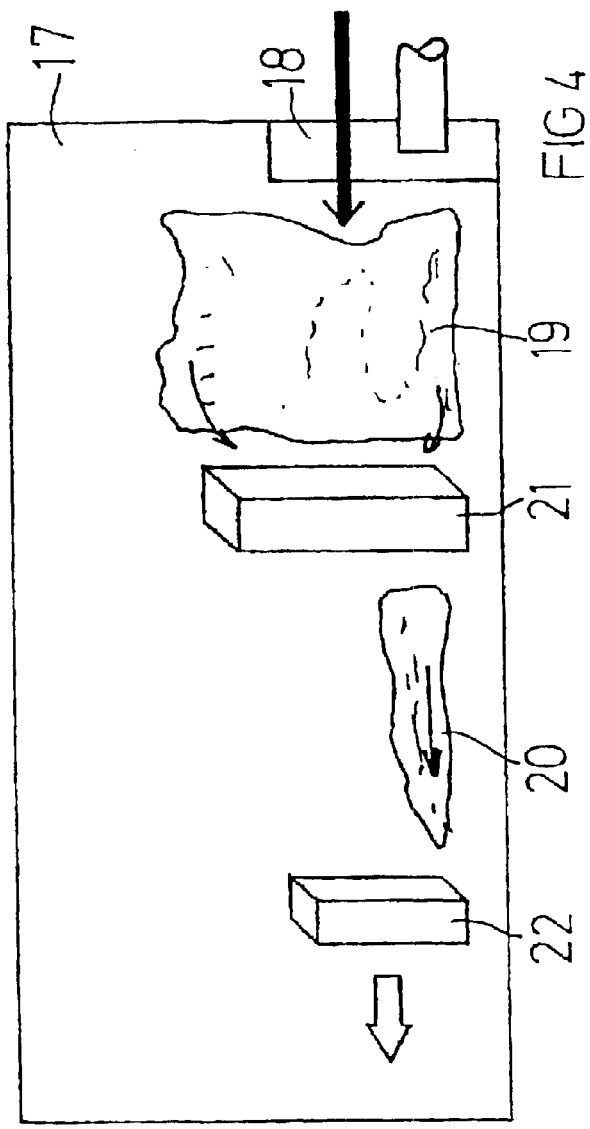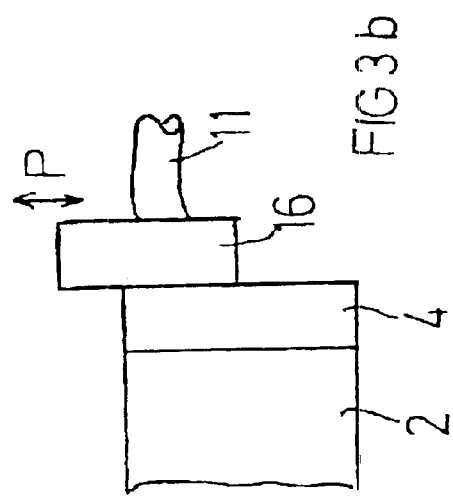

DEVICE AND METHOD FOR AIR FILTRATION

This is a nationalization of PCT/SE01/00402, filed Feb. 23, 2001 and published in Sweden.

TECHNICAL FIELD OF THE INVENTION

This invention concerns a device and a method for air filtration. The invention also concerns a system for air filtration.

BACKGROUND OF THE INVENTION

Impurities in indoor air may be categorised in two categories, firstly particles emanating from humans, activities, textiles, papers and other surfaces and the very small, submicroscopic particles coming from outdoor air such as from combustion engines, mainly diesel engines. Further, pollen, street dust etc. The second category is comprised of gases, of which $CO_2$ generally is most important, since too high $CO_2$ level in the indoor air results in deteriorated performance for humans being inside the premises.

Up till now it has been suggested to reduce the influence of these kinds of impurities by change of air and central air cleaning in the building, which can be more or less controlled as a response to measured $CO_2$ level and possibly the counted number of particles in the indoor air. Conventionally "better air quality" has been equated with a greater intake of outdoor air. This has, however, proved to be an inadequate analysis, since in principle the higher the air flow the less effective the filtration is in central filter banks, resulting in that the conventional technology for solving one problem (high $CO_2$ level) instead creates a risk of creating another: supply of large amounts of unwanted particles to the rooms.

Separate particle filters to be employed in rooms are previously well known. These filters, however, do not provide an acceptable air quality with respect to total impurity level in the air.

SUMMARY OF THE INVENTION

It is an aim of this invention to provide a device and a method whereby the problems of the prior art are eliminated or at least essentially reduced. It is also an aim to provide an efficient solution to the task of tailored cleaning of indoor air with respect to the activity profile.

This aim is obtained according to the invention in a device and a method as above.

This aim is obtained according to the invention in a device and a method as above through the features of the characterising portions of claims 1 and 12, respectively.

Hereby the air cleaning may be adapted to the prevailing air conditions in the premises in question. For example, a filter for coarse particles may be coupled in parallel and be combined with a filter for fine particles, or a particle filter with a gas filter, whereby the cleaning may be tailored for the respective environment and effectively take care of different kinds of impurities. By mixing the differently cleaned air fractions, a dilution effect is achieved in the supplied air, resulting in advantageously reduced levels in cleaned and supplied air. Through the construction of the device, simplicity with respect to production, use, service and installation is achieved as well as possibility of highly effective use of filters, since the walls of the device almost totally may be comprised of filters if desired or needed.

By the mixing taking place in a suction chamber, high efficiency and simplified construction of the device is achieved. Placing the fan in the suction chamber itself is an advantageous room saving aspect.

Through the invention, "normal" ventilation may be replaced or supplemented. The impurity particle level in the room in question and of the ventilation system may be reduced. Further, the energy consumption may be reduced at the same time as air quality may be enhanced.

In a further advantageous aspect of the invention, air from the outside is supplied from a distance to the device. This way for example outside air may be supplied to a highly effective particle filter which is placed in the device, whereby good ventilation is guaranteed at the same time as is harmful particle shaped impurities in the outside air are eliminated. This may be carried out at the same time as another part of the device cleans the air in the room in a re-circulating manner. This mix hereby results in clean oxygen rich air being mixed with clean warm indoor air.

By adjusting the exhaust as well as the blower effect, the ventilation in the premises in question may be controlled for achieving the desired effect i,e., the device according to the invention may be made adjustable for the different principles of directing air through ventilation, namely for displacement as well as mixing ventilation through the possibility of controlling the supplied air with respect to speed and distribution.

Further advantages will become clear from the following description of embodiments.

BRIEF DESCRIPTION OF DRAWINGS

The invention will now be described in greater detail at the background of embodiments and with reference to the annexed drawings, wherein:

FIG. 1*a* shows diagrammatically the exterior of a device for filtration according to the invention, FIG. 1*b* shows a detail thereof, FIG. 1*c* shows an alternative filter fastening principle, FIG. 2 shows the device in FIG. 1 having a filter panel removed, FIG. 3*a* shows a device according to the invention for supply of external air, FIG. 3*b* shows diagrammatically a detail of the device in FIG. 3*a,* and FIG. 4 shows two devices according to the invention placed in one room.

BRIEF DESCRIPTION OF THE PREFERRED EMBODIMENTS

The device for filtration 1, which is shown in FIG. 1, is essentially comprised of a parallelepiped body comprising a house 2, whereon two parallel-coupled filter units 3 and 4 are placed. These may be for example a particle filter and a gas filter such as a carbon filter. The general in-flow directions to the filters 3 and 4 are represented by the directional arrows $R_1$ and $R_2$. Sideways from the device 1 is an air exhaust in the form of a nozzle 5, which preferably is controllable with respect to direction as well as area in order to provide a desired blow-out speed for the air (not shown). This detail may in certain positions have influence on the air speed through the filter medium, that is the separation effect in % calculated on number of particles, and in particular the submicroscopic ones.

In FIG. 1*b,* which shows a detail of the device of FIG. 1*a,* the filter panel 3 is somewhat separated from the house body 2, whereby it is shown that the filter panel 3 in the edge areas comprises step portions 3', 3", which are adapted to sealingly lie against corresponding edge portions in the body of the house 2. Fixing the filter panel in inserted position may be made by for example pins, screws or the like per se known fastening elements.

In FIG. 1c filter units 3, 4 are shown, which are insertable in extended recesses in an extended house, in the directions of the arrows in this figure. Seals may be positioned in a suitable manner for sealing between the peripheries of the units 3, 4 and the house 2.

It should be noted that more than one filter unit may be positioned on the same side of a house for series connection on that side.

In FIG. 2 the filter panel 4 in FIG. 1a is removed, whereby the inside of the house 2 is shown with a suction chamber 6, one fan with motor 7 positioned in the suction chamber 6 and being supported by an intermediate wall 8. This wall is preferably air permeable so that also the portion of the house being below the intermediate wall is part of the suction chamber 6. The filter panel in question (3 or 4) is thus in operation placed over the entire surface indicated with 9, whereby the fan 7 in operation thus draws in the air through the entire surface of filter panels, which are positioned on the house 8, into the suction chamber 6. Inside this chamber, air, which is cleaned through the respective different filters, is mixed, whereafter it is drawn into the fan and is transported downwards, in the figure, through the bent air tube 10 further to the exhaust nozzle 5. In the horizontal portion of the bent air tube 10, as seen in the figure, there are preferably arranged air guiding plates 24, which aim to provide the air inside the tube 10 an at least nearly laminar flow, when it reaches the nozzle 5. This reduces noise and gives better distribution effect to the outgoing air.

The device 1 in FIG. 3a corresponds in principle with the device shown in FIGS. 1a, 1b and 2 but is further provided with a supply panel 16 for connecting the device to an external air source. In this case air is collected over an air intake 12 via for example a permanent valve (not shown), which may be provided below a window 13, through a hose 11 leading to the outside of the building, or over a hole which is taken up in a wall, which is represented with numeral 12'. The externally collected air is lead over the hose 11, which may be drawn along a radiator 14 in the room for achieving a certain heating effect to the air. Possibly there is also a manually or automatically controllable valve 15 in the hose 11. The hose 11 ends in a supply panel 16, which connects to one of the filter panels (here 4) of the device 1. Preferably the supply panel 16 connects to a highly effective particle filter 4, which has the capability of filtering away also very small particles as for example exhaust gas particles from supplied outdoor air in case outdoor air is being supplied. Air may also be collected from neighbouring rooms where cleaner or generally another air quality prevails. The device may be connected to existing cooling systems or baffles, either in ceilings or in other parts of the premises.

In FIG. 3b there is shown a diagrammatically partial horizontal section through the device in FIG. 3a showing the chute-shaped supply panel 16, which, as is shown in FIG. 3a, extends over the entire height of the filter panel 4. The arrow P indicates that the chute-shaped supply panel 16 may be adjustable sideways, for variation of the amount of outdoor air to be mixed into the filtering device 1 by the sideways displacement giving variation of the extent of the supply panel covering the panel 4 and thereby a chosen allocation of active suction surface. It should be clear that the supply panel may be constructed otherwise, for example covering an entire side or a lower part of a side.

In FIG. 4 a large room 17 is shown diagrammatically whereto ventilation air is supplied through the air intake 18. 19 represents the primary amount of impurities, which is brought with the ventilation air into the premises or is generated through activity inside the premises where it is taken care of by a first filtering device, according to the invention, 21. This device is a primary unit and provides a relatively large capacity since it is dimensioned for handling an incoming airflow with very high particle load.

In the premises after the first filtering device 21 a secondary amount of impurities 20 exists, which as an example is the sum of impurities depending on activities and persons having activities in parts of the room and certain impurities which has not been taken care of by the first filtering device 21. This secondary amount of impurities 20 has another constitution and, as a rule, essentially lower particle load than is included in the first amount of impurities, resulting in the possibility of positioning a second filtering device 22 having an essentially lower capacity and being designed for other air cleaning tasks than the first, primary filtering device 21. This way a number of units may be positioned in larger rooms, whereby each is tailored for its position and expected amount of impurities and constitution of impurities.

A very essential aspect of the invention is that the parallel-coupled filter units or filter panels (3, 4 in FIG. 1) which are placed on the device are tuned or adjusted to each other with respect to pressure drop, so that a chosen fraction of the total amount of air, which is sucked in to the suction chamber, really passes the respective filter which has as its specific task to, for example, particle clean or gas clean the air to a high degree. As is stated above, it may thus be the question of re-circulated air from the premises where the device is positioned as well as ventilation air from the outside. Further it could be the question of using a gas filter for elimination of gaseous impurities. Since the tuned fractions are subsequently mixed in the suction chamber there is achieved an advantageous dilution effect, which results in reducing resulting impurities to a very low level and after a short time of operation achieving very good air quality in the air intended for cleaning in the premises. The device may also take air from neighbouring rooms in case the air quality is enhanced through this arrangement. All taken together solution of the different problem categories is made possible with one single adapted arrangement.

The device according to the invention is adapted to be directly adapted to a specific environment. If the indoor environment is severely loaded with exhaust gases, gas filter for the outdoor air is necessary but little less particle separation. At the same time the inside activity may result in a load of small particles which have to be filtered. In that case gas filter is provided on the part sucking outdoor air in combination with a particle filter having a little lower capacity at the same time as the second side of the house may be provided with a particle filter for cleaning to a high degree.

The units are thus pressure drop adjusted and standardised in advance. Fulfilling official demands with respect to $CO_2$ level and total dust level under such circumstances is more easily achieved. Large energy losses and investments, which are inherent in older ventilation system principles, may be avoided. According to the invention the air is controlled and the path from area intake to the specific person short. Problems arising from conducting air in very long conduits in buildings, and which today are seen as results in the form of allergies and asthma, may be reduced.

A device according to the invention is very easily installed and serviced and is inexpensive, since the unit in principle is mobile, even if of course permanent installation inside the premises is possible. The invention gives flexibility with respect to different occurring kinds of impurities, and through the possibility of advantageous modular construction, an extensible production rationalisation may be carried out so that a reduced number of differently shaped houses may be easily adapted to a great number of uses.

Also more surfaces on a house such as the ones shown in the FIGS. 1a, b and 2 may be comprised of filter panels, in principle all surfaces except of course the exhaust nozzle. Further, other shapes than parallelepiped are possible, for example such having hexagonal or octagonal configuration. Using more than two parallel coupled filter units may also come into question. The placing of the filter units or panels may be made differently from what is shown in FIGS. 1b and c but preferably some kind of quick attachment is used in order to allow fast and simple change of filters.

The fan is preferably a rotating fan of centrifugal type being driven by a speed controllable electric motor but it can also be of any other kind. It is not excluded that more than one exhaust nozzle is arranged on the device and that air is conducted over a tube to a position at a distance from the device as well as of course that air may be collected, in principle according to FIGS. 3a and b, from positions at a distance of the device. In this connection it could as an example be mentioned: mixing-in of air from an air treatment device, conditioned air, de-humidified air, chilled air, heated air or air from a clean room.

The body of the device is preferably made of metal but also other materials such as plastic, glass and wood are possible. The filters coming into question are a per se known kind within the art of air filtration.

Adjusting or tuning the filter panels with respect to pressure drop may be made by adjustment of porosity, filter thickness, filter surface, filter front area or in any other way which is clear to the person skilled in the art. For example the pressure drop may be held equally high in a highly effective particle filter as in a parallel coupled gas filter, whereby thus 50% of drawn-in air is particle filtered whereas the remaining 50% is gas filtered. In another application proportions may be different so that for example by intake of ventilation air from outside and supply to a filter, filtered outdoor air comprises one third, re-circulated particle cleaned air one third and re-circulated gas cleaned air one third of the fractions being mixed in the suction chamber and being blown out from the device.

One advantage is that with a large front area the air speed is reduced at the flow through the filter medium, leading to the device being very quiet. This also makes it possible to have a functional use of highly cleaning filters. It should be noted that the construction of the device also according to other aspects result in low noise in operation.

According to a further aspect of the invention it is assured that a system including a device for air filtration according to the above or a plurality of such devices, over sensors communicate wirelessly over for example a mobile telephone system with a central computer unit. Hereby detectors are present for at least one of the parameters of human presence, temperature, air flow, electric tension over the fan, air temperature, particle load over filter, air quality, and/or $CO_2$ level in air. Through these parameter values it is possible to centrally compute service intervals for systems including devices according to the invention and monitor as well as control of the operation. The control of course necessitates distance controllable functions such as for operation intervals and fan operation for example. It is also possible to centrally store air data based on seasonal changes, around the clock variations etc. Pre-programmed data with respect to such air data may be used for controlling one or several devices included in a system. At for example work places and in schools, devices according to the invention may be controlled with respect to presence so that for example at breaks or interruptions the air flow may be forced for bringing down particle load so that thereafter, when pupils and working people are in a specific room, the device is operated with lower flows, whereby fan noise, blowing effects, etc., may be reduced when humans are in the premises.

What is claimed is:

1. Device for air filtration comprising
    housing having at least one part of a wall adapted to be comprised of an air filter, a suction fan mounted inside the housing to suck in air from the surroundings through said air filter, and at least one fan exhaust for filtered, cleaned air, said air filter including at least two different parallel coupled filter units, which are adapted to clean the air each in a different way, the different filter units being adjusted to each other with respect to pressure drop for air to be cleaned passing the filter units so that in operation a predetermined part of total sucked-in air to be cleaned passes through each respective filter unit and thus is subjected to filtration through a respective filter unit, and elements positioned in the housing for mixing the differently cleaned parts before the exhaust.

2. Device according to claim 1, wherein the housing is provided with a suction chamber which comprises the element for mixing, and said filter units are positioned in the wall of the housing.

3. Device according to claim 2, wherein the fan is arranged inside the suction chamber.

4. Device according to claim 1, wherein one filter unit is comprised of a particle filter.

5. Device according to claim 1, wherein one filter unit is comprised of a gas filter.

6. Device according to claim 1, wherein a filter unit on an upstream side is provided with a supply device for air taken from a distance from the housing, such as one of outdoor air, dehumidified air, chilled air, heated air and clean room air.

7. Device according to claim 1, wherein the filter units are comprised of panel shaped modules fastenable to a body of the housing.

8. Device according to claim 1, wherein the exhaust is controllable with respect to direction.

9. Device according to claim 1, wherein the exhaust has an adjustable shape for obtaining desired exhaust air blow speed and direction.

10. Device according to claim 1, wherein an effect of the fan is adjustable.

11. Device according to claim 1, wherein the exhaust includes a device for achieving an at least essentially laminar flow.

12. Method for air filtration comprising
    sucking air in from surroundings of a housing through an air filter comprising at least a portion of the wall of the housing, and
    blowing out the sucked in air through an exhaust to the surroundings in cleaned condition, the air being drawn through at least two different parallel coupled filter units, which clean the air, each in a different way, the different filter units being adjusted to each other with respect to pressure drop for air to be cleaned passing the respective filter units such that in operation predetermined parts of total sucked-in air passes through and is cleaned by the respective different filter units, and the differently cleaned parts are mixed before exhaust.

13. Method according to claim 12, wherein the parts are mixed in a suction chamber, in the walls of which said filter units are fastened.

14. Method according to claim 12, wherein a part of the total sucked-in air is cleaned in a particle filter.

15. Method according to claim 12, wherein a part of the total sucked-in air is cleaned in a gas filter.

16. Method according to claim 12, wherein air sucked from a distance from the housing, such as one of outdoor air, dehumidified air, chilled air, heated air and clean room air is supplied to a filter unit on an upstream side.

17. Method according to claim 12, wherein the exhaust is controlled with respect to direction.

18. Method according to claim 12, wherein a shape of the exhaust is adjusted for obtaining a desired exhaust air blow speed.

19. Method according to claim 12, wherein an effect of a fan is controlled.

20. Method according to claim 12, wherein the air in the exhaust is guided for achieving an at least essentially laminar flow.

21. Method according to claim 12, wherein at least one parameter from the group: human presence, flow, electric tension over fan, air temperature, particle load on filter, air quality, $CO_2$ level in the air, is communicated wirelessly to a central computer unit and the air filtration is controlled from parameter data.

* * * * *